(12) United States Patent
Fujimura et al.

(10) Patent No.: US 10,727,655 B2
(45) Date of Patent: Jul. 28, 2020

(54) CONDUCTION PATH

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuki Fujimura, Mie (JP); Ryoya Okamoto, Mie (JP); Hiroshi Shimizu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/356,492

(22) Filed: Mar. 18, 2019

(65) Prior Publication Data

US 2019/0305531 A1    Oct. 3, 2019

(30) Foreign Application Priority Data

Mar. 28, 2018 (JP) .................................. 2018-062111

(51) Int. Cl.
*H02G 3/03*    (2006.01)
*B60R 16/02*    (2006.01)
(Continued)

(52) U.S. Cl.
CPC ........... *H02G 3/03* (2013.01); *B60R 16/0215* (2013.01); *H01B 9/006* (2013.01); *H01B 9/02* (2013.01); *H02G 3/38* (2013.01); *B60R 16/0207* (2013.01); *H01B 7/0045* (2013.01); *H02G 3/04* (2013.01); *H02G 3/105* (2013.01); *H02G 3/128* (2013.01)

(58) Field of Classification Search
CPC ............ H02G 3/03; H02G 3/04; H02G 3/038; H02G 3/105; H02G 3/128; H01B 7/0045; H01B 13/012; H01B 13/01254; H01B 9/02; H01B 9/006
See application file for complete search history.

(56) References Cited

U.S. PATENT DOCUMENTS

| 2005/0045357 A1* | 3/2005 | Ichikawa | ............ | H02G 3/0431 |
| | | | | 174/50 |
| 2012/0205134 A1* | 8/2012 | Brasier | ................ | H02G 3/0406 |
| | | | | 174/68.3 |

FOREIGN PATENT DOCUMENTS

JP            08-235940        9/1996

\* cited by examiner

*Primary Examiner* — Paresh H Paghadal
(74) *Attorney, Agent, or Firm* — Greenblum & Bernstein, P.L.C.

(57) ABSTRACT

Provided is a technique that improves the heat dissipation properties of a wire that is arranged in a conduction path. A conduction path has a wire, a routing member that is made of a metal and has a routing groove in which the wire is routed, a bracket that is made of a metal and has a first mounting portion that is mounted to the routing member and has a second mounting portion that is mounted to an electrical connection box, and a heat transfer member that is made of a synthetic resin having a higher heat conductivity than air and is arranged in the routing groove and interposed between the wire and the routing member, in a region that corresponds to a portion of the routing member to which the first mounting portion is mounted.

18 Claims, 4 Drawing Sheets

(51) Int. Cl.
*H02G 3/38* (2006.01)
*H01B 9/02* (2006.01)
*H01B 9/00* (2006.01)
H02G 3/10 (2006.01)
H02G 3/04 (2006.01)
H02G 3/12 (2006.01)
H01B 7/00 (2006.01)

CONDUCTION PATH

TECHNICAL FIELD

The technique disclosed in the present specification relates to a conduction path in which wires are routed.

BACKGROUND ART

For example, in a vehicle such as an electric car or a hybrid car, a comparatively large electrical current flows through a device such as a power storage element, an inverter apparatus, or a motor. For this reason, there is a need to effectively dissipate the heat that is generated from wires when an electrical current is applied thereto. The technique disclosed in JP H8-235940A is known as addressing this issue.

In the technique described above, a heat dissipating coating material that has insulating properties and high thermal conductivity is provided on the outer peripheral surface of an insulating coating of the wires. Heat that is generated from the wires when an electrical current is applied thereto is transmitted from the insulating coating to the heat dissipating coating material, is effectively conducted through the heat dissipating coating material, and is effectively dissipated from the outer peripheral surface of the heat dissipating coating material to the outside thereof. Thus, the heat dissipation properties of the wires are improved.

JP H8-235940A is an example of prior art.

With the above configuration, heat that reaches the heat dissipating coating material from the wires via the insulating coating is dissipated from the heat dissipating coating material into the air. Because the thermal conductivity of air is comparatively low, the technique described above makes it difficult to sufficiently improve the heat dissipation properties of the wires.

Because the amount of heat generated by the wires decreases as the cross-sectional area of the wires increases in size, it is conceivable to increase the cross-sectional area of the wire in order to decrease the temperature rise value of the wire. However, this method cannot be employed because the wires increase in size.

SUMMARY OF THE INVENTION

The technique disclosed in the present specification has been completed based on circumstances such as those described above, and an object thereof is to provide a conduction path in which wires have improved heat dissipation properties.

The technique disclosed in the present specification is a conduction path that includes a wire, a routing member that is made of a metal and has a routing groove in which the wire is routed, a bracket that is made of a metal and has a first mounting portion that is mounted to the routing member and has a second mounting portion that is mounted to a heat accumulation member, and a heat transfer member that is made of a synthetic resin having a higher heat conductivity than air and is arranged in the routing groove and interposed between the wire and the routing member, in a region that corresponds to a portion of the routing member to which the first mounting portion is mounted.

With the above configuration, heat generated by the wire when an electrical current is applied thereto is transferred to the heat transfer member. The heat that is transferred to the heat transfer member is conducted through the heat transfer member and is transferred to the metal routing member. The heat that is transferred to the routing member is transferred to the first mounting portion of the metal bracket. The heat that is transferred to the first mounting portion is conducted through the bracket and reaches the second mounting portion. The heat that reaches the second mounting portion is transferred to the heat accumulation member. With the above configuration, the heat that is generated by the wire when an electrical current is applied thereto can be promptly transferred to the heat accumulation member without having to be transferred via air in a heat transfer path. Thus, the heat dissipation properties of the wire can be improved.

The following modes are preferred embodiments of the technique disclosed in the present specification.

The heat transfer member includes an elastic locking portion that, by elastically bending, allows the wire to be fitted into the heat transfer member, and that, in an elastically restored state, is capable of locking onto the wire and restricting disengagement of the wire.

With the above configuration, even if the wire is subject to force in a direction away from the heat transfer surface due to vibration of a vehicle, it is possible to maintain contact between the wire and the heat transfer surface. Thus, the heat dissipation properties of the wire can be further improved.

The heat transfer member has a heat transfer surface has a shape that conforms to the outer peripheral surface of the wire.

With the above configuration, because the heat transfer surface has a shape that conforms to the outer peripheral surface of the wire, it is possible to increase the contact area between the outer peripheral surface of the wire and the heat transfer surface of the heat transfer member. Thus, because the efficiency of heat transfer from the wire to the heat transfer member can be improved, the heat dissipation properties of the wire can be further improved.

A partition wall that partitions off the routing groove is provided in the routing member.

With the above configuration, it is possible to route a plurality of wires in the routing member as a result of the routing grooves being partitioned by the partition walls. The partition walls can also improve the strength of the routing member.

The routing member has a metal cover that covers an opening of the routing groove.

This configuration makes it possible to magnetically shield the wire because the opening of the routing groove is covered by the cover. The cover can also further improve the strength of the routing member.

According to the technique disclosed in the present specification, it is possible to improve the heat dissipation properties of a wire that is arranged in a conduction path.

EMBODIMENTS OF THE INVENTION

First Embodiment

Figure 1:
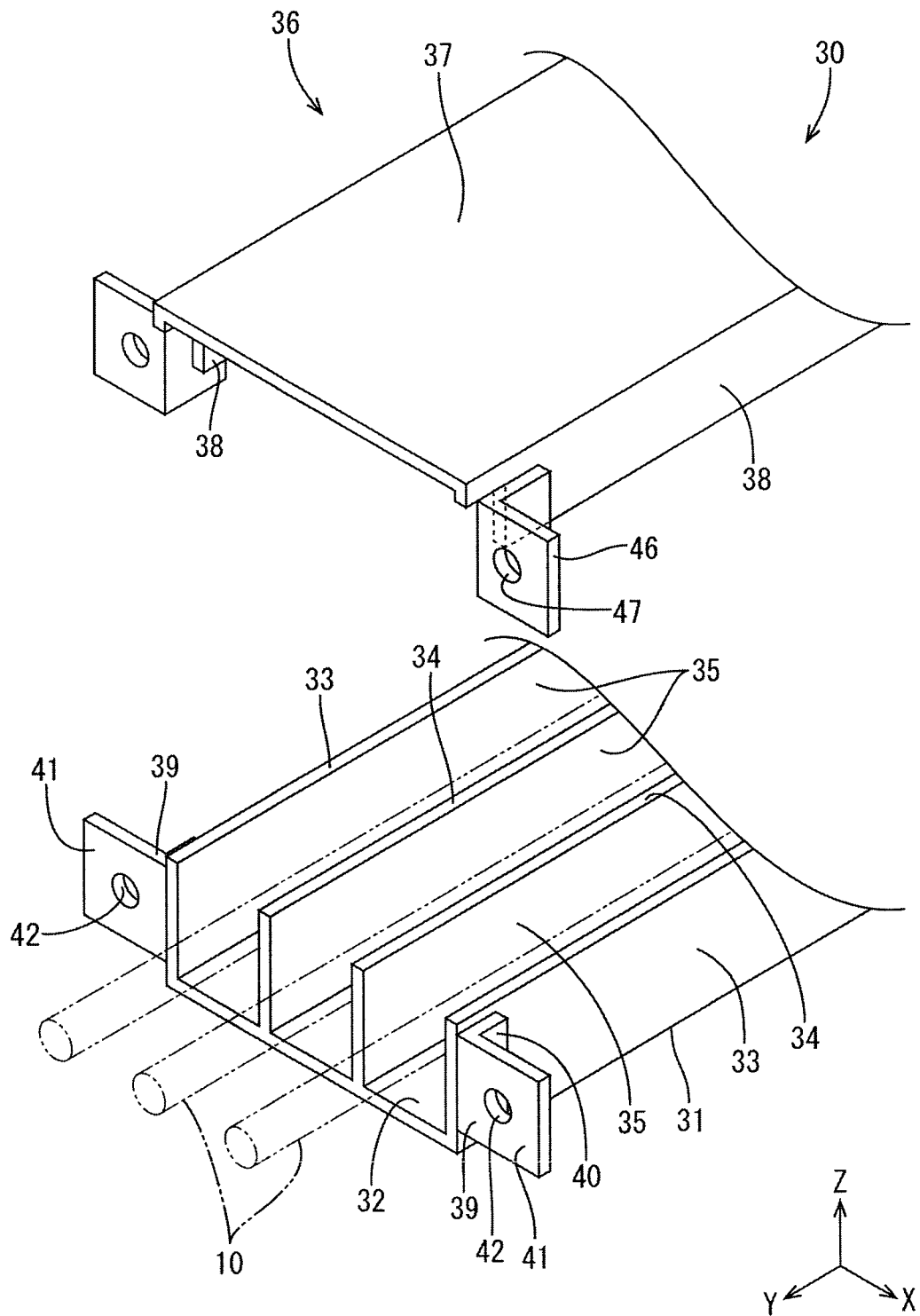
FIG. 1 is a perspective view showing a routing member and a cover of a conduction path according to a first embodiment.
Figure 2:
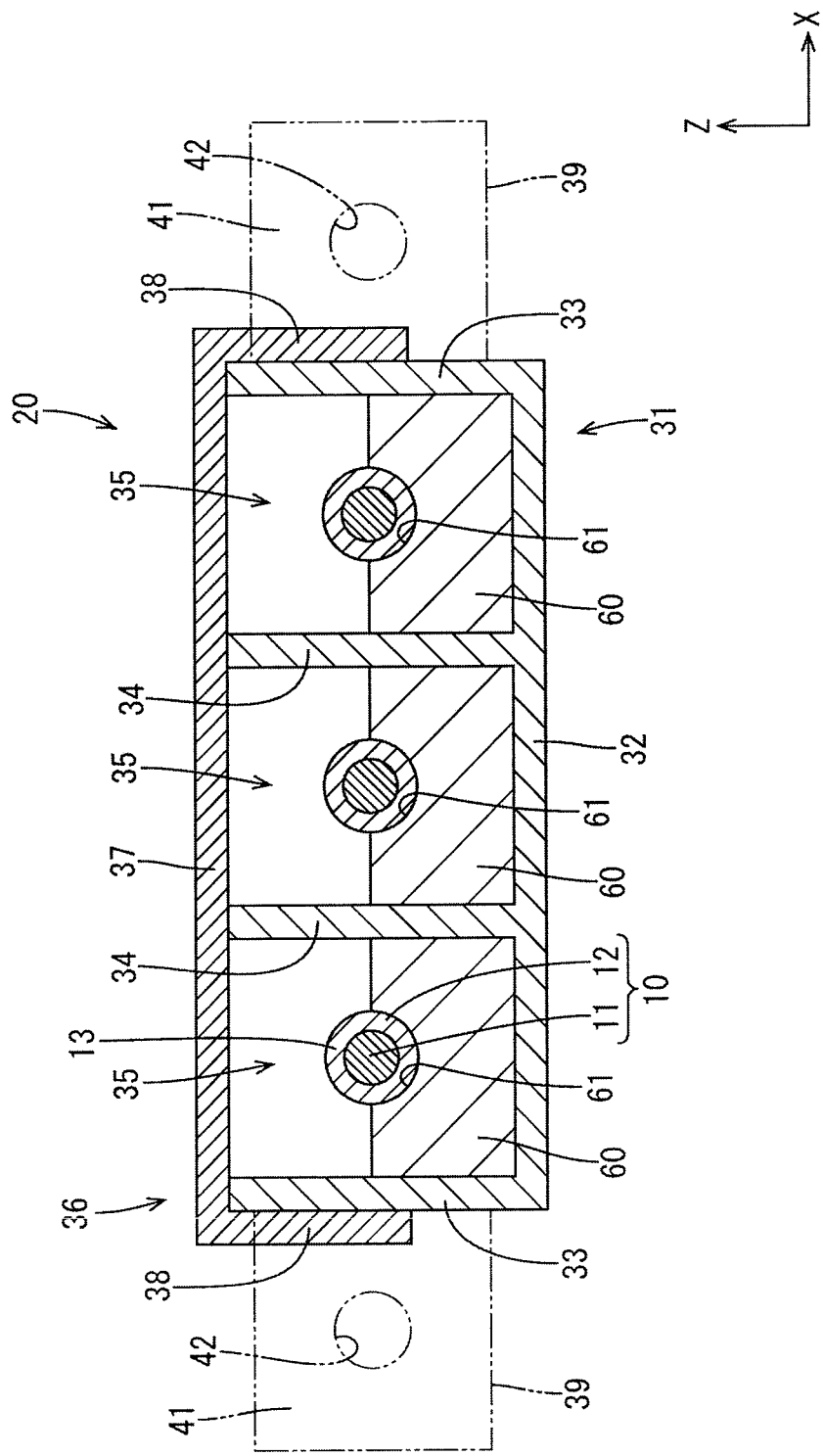
FIG. 2 is a cross-sectional view showing the conduction path.
Figure 3:
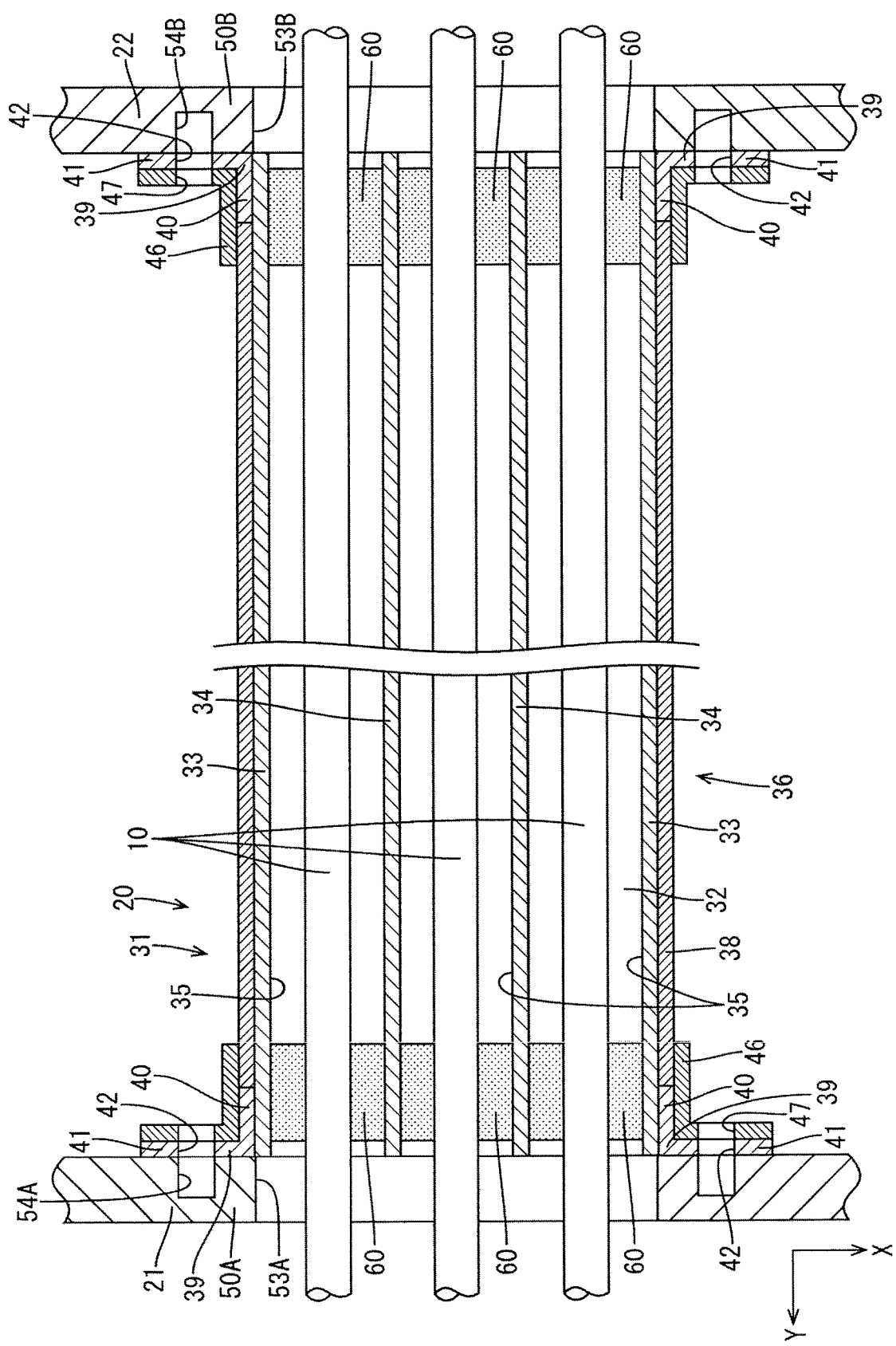
FIG. 3 is a partial cutaway longitudinal sectional view showing the conduction path.

The following is a description of a first embodiment of the technique disclosed in the present specification with reference to FIGS. 1 to 3. A conduction path 20 according to the present embodiment is used as a means of connecting a power storage module 21 (an example of a heat accumulation member) that is installed in a vehicle such as an electric car or a hybrid car (not shown), and an electrical connection box 22 (an example of a heat accumulation member). In the following description, the Z direction is upward, the Y direction is forward and the X direction is leftward. Also, pluralities of the same members may have only one member denoted with a reference numeral, and the reference numerals of the other members may be omitted.

The power storage module 21 has a plurality of power storage elements (not shown) that are housed in a metal case 50A. A through-hole 53A through which wires 10 (which will be described later) pass and a pair of female screw holes 54A positioned on both the left and right sides of the through-hole 53A are formed in the side wall of the case 50A. The metal case 50A has a comparatively large volume, and thus a comparatively large heat capacity. The power storage module 21 also has a metal member, and has a comparatively large volume, and thus a comparatively large heat capacity.

The electrical connection box 22 has a circuit structure (not shown) that is housed in a metal case 50B. A through-hole 53B through which the wires 10 pass and a pair of female screw holes 54B positioned in both the left and right sides of the through-hole 53B are formed in the side wall of the case 50A. The metal case 50B has a comparatively large volume, and thus a comparatively large heat capacity. The heat capacity of the metal case 50B increases if the electrical connection box 22 has a heat sink.

Next, the conduction path 20 of the present embodiment will be described.

The conduction path 20 has three wires 10, a routing member 31 in which the three wires 10 are routed, brackets 39 that are mounted to the routing member 31, and heat transfer members 60 that are interposed between the wires 10 and the routing member 31.

The wires 10 are composed of conductors 11 whose outer periphery is encased in an insulating coating 12, and these wires 10 are provided with a shield member that is equivalent to a shield layer composed of braided wires of a shield wire. The cross-sectional shape of the wires 10 is circular, and outer peripheral surfaces 13 of the wires 10 have a cylindrical surface.

The routing member 31 is made from an extruded material made of an aluminum alloy (although not limited thereto, and a metal material such as iron, copper or stainless steel may also be used). Accordingly, the routing member 31 is formed extending linearly, and has a cross-sectional shape that is perpendicular to the length direction (=front-back direction) and is constant across the entire length thereof. The routing member 31 has a cross-sectional shape that is comb-like overall, and has a bottom wall 32 that has a level tabular shape elongated in the front-back direction, a pair of outer walls 33 that have a tabular shape and rise perpendicular to the bottom wall 32 from both the left and right side edges of the bottom wall 32, and a pair of left and right partition walls 34 that have a tubular shape and rise perpendicular from the upper surface of the bottom wall 32 between the outer walls 33. The pitch between the partition walls 34 is one third of the pitch between the outer walls 33, and the spaces between the outer walls 33 and the adjacent partition walls 34 are substantially the same as the space between the partition walls 34. The bottom wall 32, the outer walls 33 and the partition walls 34 form three routing grooves 35 in the routing member 31, the routing grooves being open upward and elongated in the front-back direction. The three routing grooves 35 are arranged side-by-side in the left-right direction, and are partitioned by the partition walls 34.

The routing grooves 35 each individually house one wire 10. Here, the height of the routing grooves 35 is roughly the same as the width thereof, and the size of the grooves is set to be slightly larger than the outer diameter of the wires 10. Accordingly, no sections of the wires 10 that are housed in the routing grooves 35 protrude outside of the routing grooves 35.

A cover 36 is mounted to the routing member 31, the cover 36 being made from an extruded material of an aluminum alloy (although not limited thereto, and a metal material such as iron, copper or stainless steel may also be used), the same as the routing member 31. The cover 36 is made from an elongated, level cover plate 37 that corresponds to the upper surface of the routing member 31, and a pair of locking edge portions 38 that extend downward from both left and right side edges of the cover plate 37. The cover 36 engages with the routing member 31 in a state in which the cover plate 37 covers all of the openings in the upper side of the three routing grooves 35, the bottom surface of both left and right side edges of the cover plate 37 abut the upper edge surface of the outer walls 33 and the locking edge portions 38 are in close contact with the outer surface of the outer walls 33. By the outer walls 33 of the routing member 31 being in close contact with the locking edge portions 38 of the cover 36, an inner space encased by the routing member 31 and the cover 36 is electromagnetically shielded.

In both the front and rear end portions of the routing member 31, as a means of connecting the power storage module 21 and the electrical connection box 22, the L-shaped brackets 39 are each individually fixed to the outer surfaces of the left and right outer walls 33 through a means such as welding. The brackets 39 are constituted by first mounting portions 40 that are in close contact with the outer walls 33 and second mounting portions 41 that extend outward in the left-right direction from the edge of their respective first mounting portions 40, and bolt holes 42 that pass in the front-back direction are formed in the second mounting portions 41.

On the other hand, in both the front and rear end portions of the cover 36, as a means of connecting the power storage module 21 and the electrical connection box 22, and as a means of fixing the cover 36 to the routing member 31, L-shaped brackets 46 are individually fixed to the outer surfaces of the left and right locking edge portions 38 through a means such as welding. Bolt holes 47 that pass though in the front-back direction are formed in the plate portion of the brackets 46 that extends outward in the left-right direction perpendicular to the locking edge portions 38.

In the state in which the cover 36 is engaged with the routing member 31, the brackets 46 are in close contact with the brackets 39 and the bolt holes 42 and 47 are aligned. By tightening bolts in the bolt holes 42 and 47, the cover 36 and the routing member 31 are held in an engaged state, and the cover 36 and the routing member 31 are connected to the power storage module 21 and the electrical connection box 22. Note that, the means of fixing the cover 36 to the routing member 31 is not limited to bolts, and other means may also be used, such as clamping the cover 36 and the routing member 31 from above and below with a clamping member (not shown), coiling a binding band material (not shown) around the outer periphery of the cover 36 and the routing member 31, and welding.

The heat transfer members 60 are arranged in the routing grooves 35 in regions of the routing member 31 that correspond to portions to which the first mounting portions 40 of the brackets 39 are mounted. The heat transfer members 60 are mounted to the routing member 31 through a well known means, and may be fitted or adhered to the routing member 31, or fastened to the routing member 31 with screws.

The heat transfer members 60 are made from a synthetic resin that has a higher heat conductivity than air. The synthetic resin that constitutes the heat transfer members 60 may have insulating properties, and may have conductive properties. Also, the synthetic resin that constitutes the heat transfer members 60 may include a filler that has high heat conductivity, such as a metal powder or pieces of a metal. Any material, such as polyolefin, polyamide, polyester, synthetic rubber or natural rubber, can be appropriately selected as the synthetic resin according to need.

The heat transfer members 60 have a block-like shape, with heat transfer surfaces 61 on which the wires 10 are placed being formed to be recessed into the upper surface thereof. The shape of the heat transfer surfaces 61 conform to the shape of the outer peripheral surfaces of the wires 10. In the present embodiment, the cross-sectional shape of the heat transfer surfaces 61 is circular, and the diameter of the semicircle constituting the heat transfer surfaces 61 is set to be substantially the same as the outer diameter of the wires 10. "Substantially the same" includes the case in which the diameter of the semicircle constituting the heat transfer surfaces 61 is the same as the outer diameter of the wires 10, and also includes the case in which, the diameter of the semicircle constituting the heat transfer surfaces 61, even though different to the outer diameter of the wires 10, is slightly larger or slightly smaller to an extent that is recognized as being substantially the same.

In a state in which the wires 10 are placed on the heat transfer members 60, at least a part of each outer peripheral surface 13 of the wires 10 comes into close contact with the heat transfer surfaces 61 of the heat transfer members 60 due to the own weight of the wires 10. Note that the entirety of the heat transfer surfaces 61 of the heat transfer members 60 may also be in close contact with the outer peripheral surfaces 13 of the wires 10.

The size of the heat transfer members 60 in the left-right direction is approximately the same size as the space between the adjacent outer walls 33 and partition walls 34, or the space between the partition walls 34. Thus, the heat transfer members 60 are brought into close contact with the bottom wall 32 of the routing member 31 from above, and are brought into close contact with the outer walls 33 or the partition walls 34 from the left-right direction.

In FIG. 3, front end edges of the heat transfer members 60 that are arranged on the front side are set in a position that is the same as, or slightly rearward of, the front end edge of the brackets 39. Also, the rear end edges of the heat transfer members on the front side are set in a position that is the same as, or a lower position that is slightly rearward of, the rear end edges of the brackets 39, and are set in a position that is the same as, or slightly forward of, the rear end edge of the brackets 46.

In FIG. 3, the rear end edges of the heat transfer members 60 that are arranged on the rear side are set in a position that is the same as, or slightly forward of, the brackets 39. Also, the front end edges of the heat transfer members on the rear side are set in a position that is the same as, or a lower position that is slightly rearward of, the front end edges of the brackets 39, and are set in a position that is the same as, or slightly rearward of, the front end edges of the brackets 46.

The following describes an example of a process for manufacturing the conduction path 20 described above. The manufacturing process of the conduction path 20 is not limited to the following description.

The first mounting portions 40 of the brackets 39 are fixed to the routing member 31 that has been formed through extrusion molding. The brackets 46 are fixed to the cover 36 that has been formed through extrusion molding.

The heat transfer members 60 are arranged in positions that correspond to the brackets 39, in the routing grooves 35 of the routing member 31. Each routing groove 35 houses a wire 10, and the wires are placed on the heat transfer surfaces 61 of the heat transfer members 60. The cover 36 is fitted to the routing member 31 from above.

When connecting the conduction path 20 to the power storage module 21, first, the three wires 10 are inserted into the through-hole 53A in the case 50A. Next, the second mounting portions 41 of the brackets 39 on the front side are abutted against an outer surface of the case 50A, and bolts (not shown) that are inserted into the bolt holes 42 of the brackets 39 and the bolt holes 47 of the brackets 46 are screwed into the female screw holes 54A of the case 50A and tightened. Thus, the routing member 31 and cover 36 of the conduction path 20 are electrically connected to the case 50A on the front side.

Note that the connection between the conduction path 20 and the electrical connection box 22 is performed in a similar manner as the power storage module 21 described above.

Next, the effects of the present embodiment will be described. The conduction path 20 according to the present embodiment includes wires 10, a routing member 31 that is made of a metal and has routing grooves 35 in which the wires 10 are routed, brackets 39 that are made of a metal and have first mounting portions 40 that are mounted to the routing member 31 and have second mounting portions 41 that are mounted to the electrical connection box 22 or the power storage module 21, and heat transfer members 60 that are made of a synthetic resin having a higher heat conductivity than air and are arranged in the routing grooves 35 and interposed between the wires 10 and the routing member 31, in a region that corresponds to a portion of the routing member 31 to which the first mounting portions 40 are mounted.

With the above configuration, heat generated by the wires 10 when an electrical current is applied thereto is transferred to the heat transfer members 60. The heat that is transferred to the heat transfer members 60 is conducted through the heat transfer members 60 and transferred to the metal routing member 31. The heat that is transferred to the routing member 31 is transferred to the first mounting portions 40 of the metal brackets 39. The heat that is transferred to the first mounting portions 40 is conducted through the brackets 39 and reaches the second mounting portion 41. The heat that reaches the second mounting portions 41 is transferred to the case 50A of the power storage module 21 or the case 50B of the electrical connection box 22. In this way, with the above configuration, the heat that is generated by the wires 10 when an electrical current is applied thereto can be promptly transferred to the case 50A of the power storage module 21 or the case 50B of the electrical connection box 22 without being transferred via air in a heat transfer path. Thus, the heat dissipation properties of the wires 10 can be improved.

Also, the heat transfer members 60 are arranged in a portion that corresponds to the first mounting portions 40 of the routing member 31, and can thus lighten the conduction path 20 as well as reduce costs in comparison to a case in which the heat transfer members 60 are arranged across the entire length of the routing member 31.

Also, with this configuration, the heat transfer members 60 have heat transfer surfaces 61 whose shape conforms to that of the outer peripheral surfaces 13 of the wires 10.

With the above configuration, because the heat transfer surfaces 61 have a shape that conforms to the outer peripheral surfaces 13 of the wires 10, it is possible to increase the contact area between the outer peripheral surfaces 13 of the wires 10 and the heat transfer surfaces 61 of the heat transfer members 60. Thus, because the efficiency of transferring heat from the wires 10 to the heat transfer members 60 can be improved, the heat dissipation properties of the wires 10 can be further improved.

Also, in the present embodiment, partition walls 34 that partition the routing grooves 35 are provided in the routing member 31.

With the above configuration, it is possible to route a plurality of wires 10 in the routing member 31, due to the routing grooves 35 being partitioned by the partition walls 34. Also, the partition walls 34 can improve the strength of the routing member 31.

Also, in the present embodiment, the routing member 31 has a metal cover 36 that covers the routing grooves 35.

With the above configuration, because the routing grooves 35 are covered by the cover 36, it is possible to electromagnetically shield the wires 10. Also, the cover 36 can further improve the strength of the routing member 31.

Second Embodiment

Figure 4:
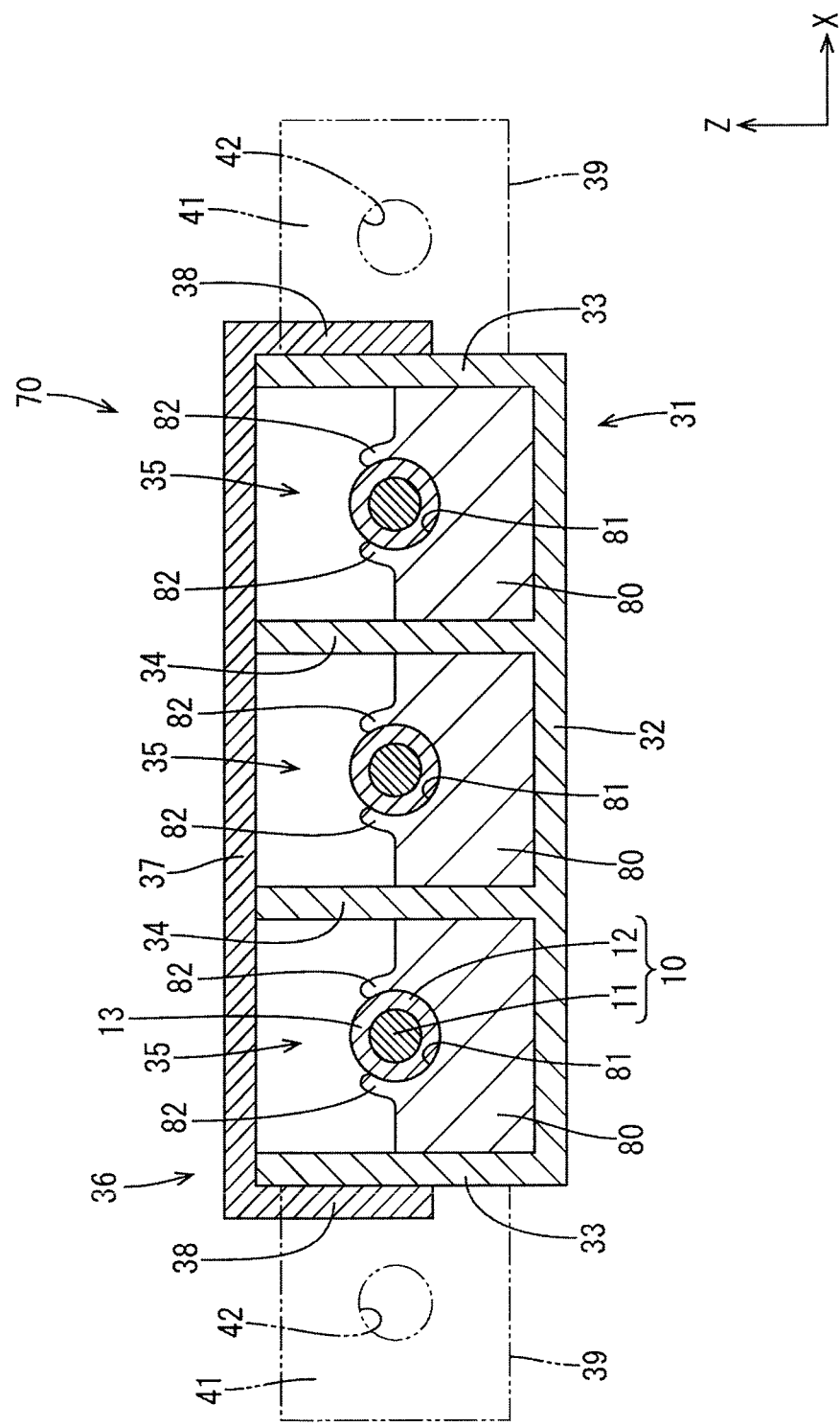
FIG. 4 is a cross-sectional view showing the conduction path according to a second embodiment.

The following describes a second embodiment of the technique disclosed in the present specification with reference to FIG. 4. A conduction path 70 according to the present embodiment has heat transfer members 80 that are configured differently from that in the first embodiment. Other configurations are the same as in the first embodiment, and thus the same configurations will be denoted with the same reference numerals and descriptions of their structure, operation and effect will be omitted.

On the upper surfaces of the heat transfer members 80, pairs of elastic locking portions 82 rise upward in both the left and right side portions of a heat transfer surface 81 and are integrally formed with the heat transfer members 80. The pairs of elastic locking portions 82 are formed such that their upper end portions approach one another. Through this, the space between each pair of elastic locking portions 82 in the left-right direction is set to be smaller than the diameter of the wires 10. The pairs of elastic locking portions 82 are formed to be comparatively thin in the left-right direction, and are elastically deformable.

The wires 10 are pushed into the pairs of elastic locking portions 82 from above. This results in the pairs of elastic locking portions 82 elastically deforming so as to spread open in the left-right direction. If the wires 10 are pushed further downward, the pairs of elastic locking portions 82 elastically restore so as to close together. Thus, the outer peripheral surfaces of the wires 10 are pressed by the pairs of elastic locking portions 82 so as to come in close contact with the heat transfer surfaces 81.

The conduction path 70 according to the present second embodiment described above is provided with an elastic locking portion 65 that, by elastically bending, allows the wires 10 to be fitted into the heat transfer member 81, and that, in an elastically restored state, is capable of locking onto the wires 10 and restricting disengagement of the wires 10.

With the above configuration, even if the wires 10 are subject to force in a direction away from the heat transfer surfaces 81 due to vibration of a vehicle, it is possible to maintain contact between the wires 10 and the heat transfer surfaces 81. Thus, the heat dissipation properties of the wires 10 can be further improved.

Other Embodiments

The technique disclosed in the present specification is not limited to the embodiments described above with reference to the drawings, and, for example, the following embodiments are also included within the technical scope of the technique disclosed in the present embodiment.

(1) In the present embodiment, the power storage module 21 and the electrical connection box 22 are given as examples of the heat accumulation member, but the present invention is not limited thereto, and a metal member such as a metal frame, a metal case, or a vehicle body may be used.

Also, the conduction path according to the present embodiment may be applied to a routing structure of a wire in a battery pack that has a plurality of power storage elements.

(2) The number of wires arranged in one routing member 31 may also be one or two wires, or may also be four or more wires. Also, the partition walls 34 may be omitted.

(3) The present embodiment discloses a configuration in which the brackets 39 are respectively mounted to the front and rear end portions of one routing member 31, but no aspect of the present invention is limited to this, and a configuration is also possible in which one or three or more brackets are mounted to any position such as an intermediate portion of one routing member, and heat transfer members are arranged on a corresponding portion of the routing member.

(4) The present embodiment discloses a configuration in which the heat transfer members 60 are arranged in positions that correspond to the brackets 39, in the routing member 31, but the present invention is not limited thereto, and the routing member 31 may be provided with a heat transfer member that spans the entire length thereof.

(5) The present embodiment discloses a configuration in which the cover 36 is mounted to the routing member 31, but no aspect of the present invention is limited to this, and the cover may be omitted.

(7) In the present invention, the cross-sectional shape of the wires 10 is circular, but no aspect of the present invention is limited to this, and the cross-sectional shape of the wires 10 may be rectangular, elliptical or oval (a shape formed by both end portions of two parallel straight lines being linked in a semicircular shape). The heat transfer surface of the heat transfer member can take any shape, such as a U-shape, a C-shape or a semicircular shape, provided the shape conforms to the shape of the outer peripheral surface of the wires.

(8) The present embodiment discloses a configuration in which one heat transfer surface 61 or 81 is formed in one heat transfer member 60 or 80, but no aspect of the present embodiment is limited to this, and a configuration is also possible in which a plurality (two or more) of heat transfer surfaces are formed in one heat transfer member.

LIST OF REFERENCE NUMERALS

10: Wires
13: Outer peripheral surface
20, 70: Conduction path
21: Power storage module
22: Electrical connection box
31: Routing member
34: Partition wall
35: Routing groove
36: Cover
39: Bracket
40: First mounting portion
41: Second mounting portion
60, 80: Heat transfer member
61, 81: Heat transfer surface
82: Elastic locking portion

What is claimed is:

1. A conduction path comprising:
   a wire;
   a routing housing that is made of metal and has a routing groove in which the wire is routed;
   a first bracket that is made of metal and has a first mount that is mounted to the routing housing and has a second mount that is mounted to a heat accumulator;
   a heat transfer material that is made of synthetic resin having a higher heat conductivity than air and is arranged in the routing groove and interposed between the wire and the routing housing, in a region that corresponds to a portion of the routing housing to which the first mount is mounted; and
   a cover to cover an opening of the routing groove, the cover including a side wall and a second bracket fixed to the side wall, wherein
   when the cover is disposed on the routing housing and covers the opening of the routing groove, the side wall and the first mount are coplanar with one another, the second bracket overlaps with the second mount in a direction in which the wire is routed in the routing groove, and the second bracket overlaps with the first mount in a direction perpendicular to the direction in which the wire is routed in the routing groove,
   the heat transfer material has a heat transfer surface having a shape that conforms to an outer peripheral surface of the wire, and
   the heat transfer material includes an elastic lock that, by elastically bending, allows the wire to be fitted into the heat transfer material, and that, in an elastically restored condition, is lockable onto the wire and is to restrict disengagement of the wire.

2. The conduction path according to claim 1, wherein the routing housing is provided with a partition wall that partitions off the routing groove.

3. The conduction path according to claim 1, wherein the cover is made of metal.

4. The conduction path according to claim 1, wherein the heat transfer material has a heat transfer surface having a shape that contours an outer peripheral surface of the wire, the outer peripheral surface of the wire spanning from a point on a first side of the wire to a point on a second side of the wire that is opposite to the first side.

5. The conduction path according to claim 4, wherein the shape includes a curved shape.

6. The conduction path according to claim 1, wherein the heat transfer material has a heat transfer surface having a shape that contours an outer peripheral surface of the wire, the outer peripheral surface of the wire spanning a majority of a perimeter around the wire.

7. The conduction path according to claim 6, wherein the shape includes a curved shape.

8. The conduction path according to claim 1, wherein an outer surface of the heat transfer material that is closest to an opening of the routing groove includes two surface segments that are horizontal surfaces.

9. The conduction path according to claim 8, where each of the horizontal surfaces is sandwiched between the wire and a respective side wall of the routing groove.

10. The conduction path according to claim 1, wherein the heat transfer material is arranged such that an entire space in the routing groove that is below a level of the wire is filled entirely with the heat transfer material.

11. The conduction path according to claim 1, wherein the heat transfer material includes insulating properties.

12. The conduction path according to claim 1, wherein the heat transfer material includes conductive properties.

13. The conduction path according to claim 1, wherein heat generated by the wire when an electrical current is applied to the wire is conducted through the heat transfer material, the heat conducted through the heat transfer material is transferred to the routing housing, the heat transferred to the routing housing is transferred to the first mount of the first bracket, the heat transferred to the first mount is conducted through the first bracket to the second mount of the bracket, and the heat transferred to the second mount is transferred to the heat accumulator.

14. The conduction path according to claim 1, wherein the heat transfer material is arranged entirely in the routing groove.

15. The conduction path according to claim 1, wherein the first bracket and the second bracket are each an L-shaped bracket.

16. The conduction path according to claim 1, wherein an end of the side wall and an end of the first mount abut one another other at an interface, and the second bracket covers the interface.

17. The conduction path according to claim 1, wherein when the cover is disposed on the routing housing and covers the opening of the routing groove, the first mount is sandwiched between the heat transfer material and the second bracket.

18. A conduction path comprising:
   a wire;
   a routing housing that is made of metal and has a routing groove in which the wire is routed;
   a first bracket that is made of metal and has a first mount that is mounted to the routing housing and has a second mount that is mounted to a heat accumulator;
   a heat transfer material that is made of synthetic resin having a higher heat conductivity than air and is arranged in the routing groove and interposed between the wire and the routing housing, in a region that corresponds to a portion of the routing housing to which the first mount is mounted; and
   a cover to cover an opening of the routing groove, the cover including a side wall and a second bracket fixed to the side wall, wherein
   when the cover is disposed on the routing housing and covers the opening of the routing groove, the side wall and the first mount are coplanar with one another, the second bracket overlaps with the second mount in a direction in which the wire is routed in the routing groove, and the second bracket overlaps with the first mount in a direction perpendicular to the direction in which the wire is routed in the routing groove, and the heat transfer material at least partially surrounds only the wire that is a single wire.

\* \* \* \* \*